(12) United States Patent
Hsu et al.

(10) Patent No.: US 12,441,433 B2
(45) Date of Patent: Oct. 14, 2025

(54) MOROR DRIVING SYSTEM AND MOTOR DRIVING METHOD THEREOF

(71) Applicant: Acer Incorporated, New Taipei (TW)

(72) Inventors: Jung-Chu Hsu, New Taipei (TW); Yen-Hua Cheng, New Taipei (TW)

(73) Assignee: Acer Incorporated, New Taipei (TW)

( * ) Notice: Subject to any disclaimer, the term of this patent is extended or adjusted under 35 U.S.C. 154(b) by 442 days.

(21) Appl. No.: 17/827,796

(22) Filed: May 30, 2022

(65) Prior Publication Data

US 2023/0339571 A1   Oct. 26, 2023

(30) Foreign Application Priority Data

Apr. 25, 2022   (TW) .................................. 111115698

(51) Int. Cl.
*B62M 6/50* (2010.01)
*B60L 15/20* (2006.01)
*B62J 43/13* (2020.01)

(52) U.S. Cl.
CPC ............... *B62M 6/50* (2013.01); *B60L 15/20* (2013.01); *B62J 43/13* (2020.02); *B60L 2200/12* (2013.01); *B60L 2240/12* (2013.01)

(58) Field of Classification Search
CPC ............. B62M 6/40; B62M 6/45; B62M 6/50
See application file for complete search history.

(56) References Cited

U.S. PATENT DOCUMENTS

| | | | |
|---|---|---|---|
| 2014/0257613 A1 | 9/2014 | Tang | |
| 2019/0061872 A1* | 2/2019 | Jackson | ............... B60K 17/043 |
| 2019/0152561 A1* | 5/2019 | Chuang | ............... F16H 61/0204 |
| 2023/0062161 A1* | 3/2023 | Wakuta | ................. B62K 23/02 |
| 2023/0242208 A1* | 8/2023 | Numata | ................. B62M 9/122 |
| | | | 180/206.2 |

FOREIGN PATENT DOCUMENTS

| | | |
|---|---|---|
| CN | 108639224 | 10/2018 |
| CN | 108909529 | 11/2018 |
| CN | 109070964 | 12/2018 |
| KR | 100997543 | 11/2010 |
| TW | 144494 | 10/1990 |
| TW | 201607830 | 3/2016 |
| TW | 202021857 | 6/2020 |
| TW | 202142443 | 11/2021 |

* cited by examiner

*Primary Examiner* — Imran K Mustafa
(74) *Attorney, Agent, or Firm* — JCIPRNET

(57) ABSTRACT

A motor driving system and a motor driving method adapted to an electric bicycle are provided. The motor driving system includes a sensing device, a front driving motor, a rear driving motor, a front driving device, and a rear driving device. The sensing device generates sensing information. The front driving device drives the front driving motor according to the sensing information. The rear driving device drives the rear driving motor according to the sensing information. When the motor driving system is powered-up, the front driving device and the rear driving device respectively perform a master-slave query operation to each other, and it is determined that one of the front driving device and the rear driving device includes a master controller according to a result of the master-slave query operation.

14 Claims, 2 Drawing Sheets

MOROR DRIVING SYSTEM AND MOTOR DRIVING METHOD THEREOF

CROSS-REFERENCE TO RELATED APPLICATION

This application claims the priority benefit of Taiwan application serial no. 111115698, filed on Apr. 25, 2022. The entirety of each of the above-mentioned patent applications is hereby incorporated by reference herein and made a part of this specification.

BACKGROUND

Technical Field

The disclosure relates to a motor driving device, and in particular to a motor driving system for electric bicycle and a motor driving method thereof.

Description of Related Art

The motor-driven architecture of an electric bicycle widely uses a front-wheel driving architecture or a rear-wheel driving architecture. Generally, a front-wheel driving architecture uses a front driving controller to drive a front driving motor to drive the front wheels, while a rear-wheel driving architecture uses a rear driving controller to drive a rear driving motor to drive the rear wheels. However, the front-wheel driving architecture requires the battery to be placed on the rear half of the electric bicycle. Therefore, when the center of gravity is behind when climbing, the motor cannot effectively apply force. On the other hand, the rear-wheel driving architecture usually adopts an in-wheel motor, which can increase the output of the rear-wheel motor due to the distribution of the center of gravity when climbing. However, the stability is poor during cruising or high-speed cruising in urban areas.

SUMMARY

A motor driving system and a motor driving method thereof are provided. The front driving motor and the rear driving motor are respectively driven by two driving devices, such as a front driving device and a rear driving device.

The embodiment of the present application provides a motor driving system suitable for electric bicycles. The motor driving system includes a sensing device, a front driving motor, a rear driving motor, a front driving device, and a rear driving device. The sensing device generates sensing information. The front driving device drives the front driving motor according to the sensing information. The rear driving device drives the rear driving motor according to the sensing information. When the motor driving system is powered-up, the front driving device and the rear driving device respectively perform a master-slave query operation to each other, and it is determined that one of the front driving device and the rear driving device includes a master controller according to a result of the master-slave query operation.

The embodiment of the present application provides a motor driving method suitable for a motor driving system of the electronic bicycles. The motor driving system includes a sensing device, a front driving motor, a rear driving motor, a front driving device, and a rear driving device. The motor driving method includes: performing the master-slave query operation respectively by the front driving device and the rear driving device to each other when the power is turned on; determining that one of the front driving device and the rear driving device includes a master controller according to a result of the master-slave query operation.

Based on the above, in some embodiments of the present application, the front driving motor and the rear driving motor are driven by two driving devices, such as the front driving device and the rear driving device, respectively, which can improve the stability of high-speed cruise and reduce the cost of the driving device.

In order to make the above-mentioned features and advantages of the present application more obvious and easier to understand, the following specific examples are given, and are described in detail as follows in conjunction with the accompanying drawings.

DESCRIPTION OF THE EMBODIMENTS

Figure 1:
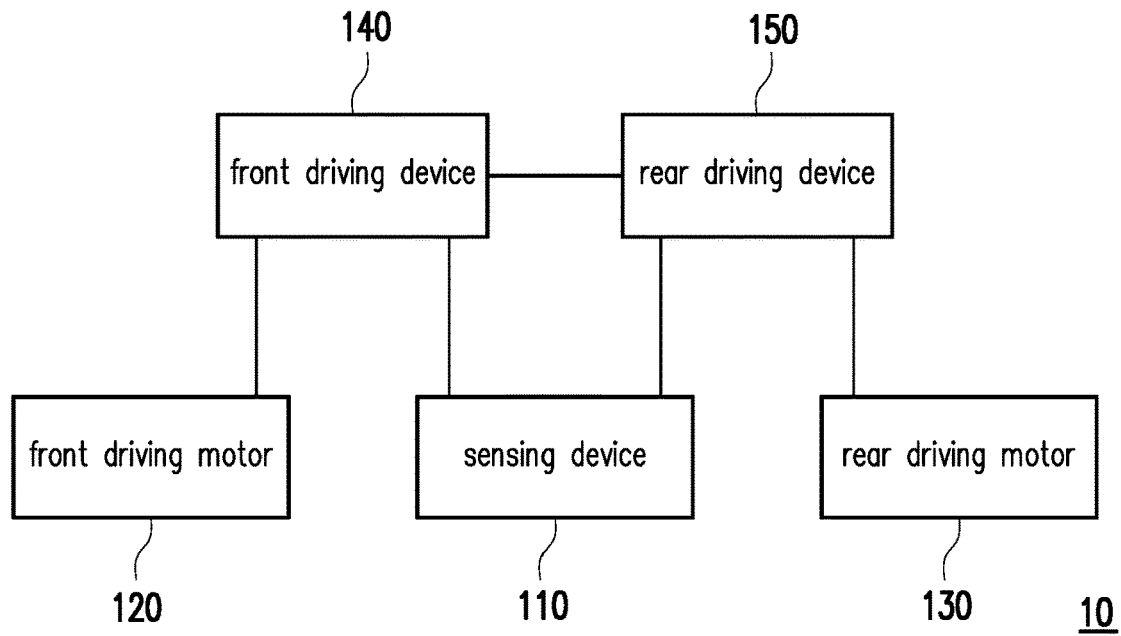
FIG. 1 is a schematic diagram of a motor driving system according to an embodiment of the present application.

The term "coupled (or connected)" as used throughout the specification (including the scope of the application) may refer to any direct or indirect means of connection. For example, if the text describes that a first device is coupled (or connected) to a second device, it should be construed that the first device can be directly connected to the second device. Alternatively, the first device may be indirectly connected to the second device through other devices or some connection means. Also, where possible, elements/components/steps using the same reference numerals in the drawings and embodiments represent the same or similar parts. Elements/components/steps that use the same reference numerals or use the same terminology in different embodiments may refer to relative descriptions of each other.

FIG. 1 is a schematic diagram of a motor driving system according to an embodiment of the present application. Referring to FIG. 1, the motor driving system 10 is adapted to an electronic bicycle. The motor driving system 10 includes a sensing device 110, a front driving motor 120, a rear driving motor 130, a front driving device 140, and a rear driving device 150, but not limited thereto. The sensing device 110 is configured to sense the electronic bicycle to generates sensing information, and the sensing information is, for example, rotational speed information and torque information, but not limited thereto. The front driving motor 120 and the rear driving motor 130 is, for example, configured to drive the front and rear wheels of the electronic bicycle, and the present application does not limit the types of the front driving motor 120 and the rear driving motor 130. The front driving device 140 is coupled to the sensing device 110 and the front driving motor 120, and the front driving device 140 is configured to drive the front driving motor 120 according to the sensing information. The rear driving device 150 is coupled to the sensing device 110, the rear driving motor 130, and the front driving device 140. The rear driving device 150 is configured to drive the rear driving motor 130 according to the sensing information. In this embodiment, all components in the motor driving system 10 are coupled by a Controller Area Network (CAN), but not limited thereto. When the motor driving system 10 is powered-up, the front driving device 140 and the rear driving device 150 respectively perform a master-slave query operation to each other, and it is determined that one of the front driving device 140 and the rear driving device 150 includes a master controller. The master-slave query operation is, for example, querying the master-slave relationship between the front driving device 140 and the rear driving device 150. The master-slave relationship is, for example, one of the front driving device 140 and the rear driving device 150 is the master, and the other is the slave. The one of the front driving device 140 and the rear driving device 150 that is the master includes a master controller, and the other that is the slave includes a slave controller. The details of the master-slave query operation, power reading and motor driving will be described in detail later.

Figure 2:
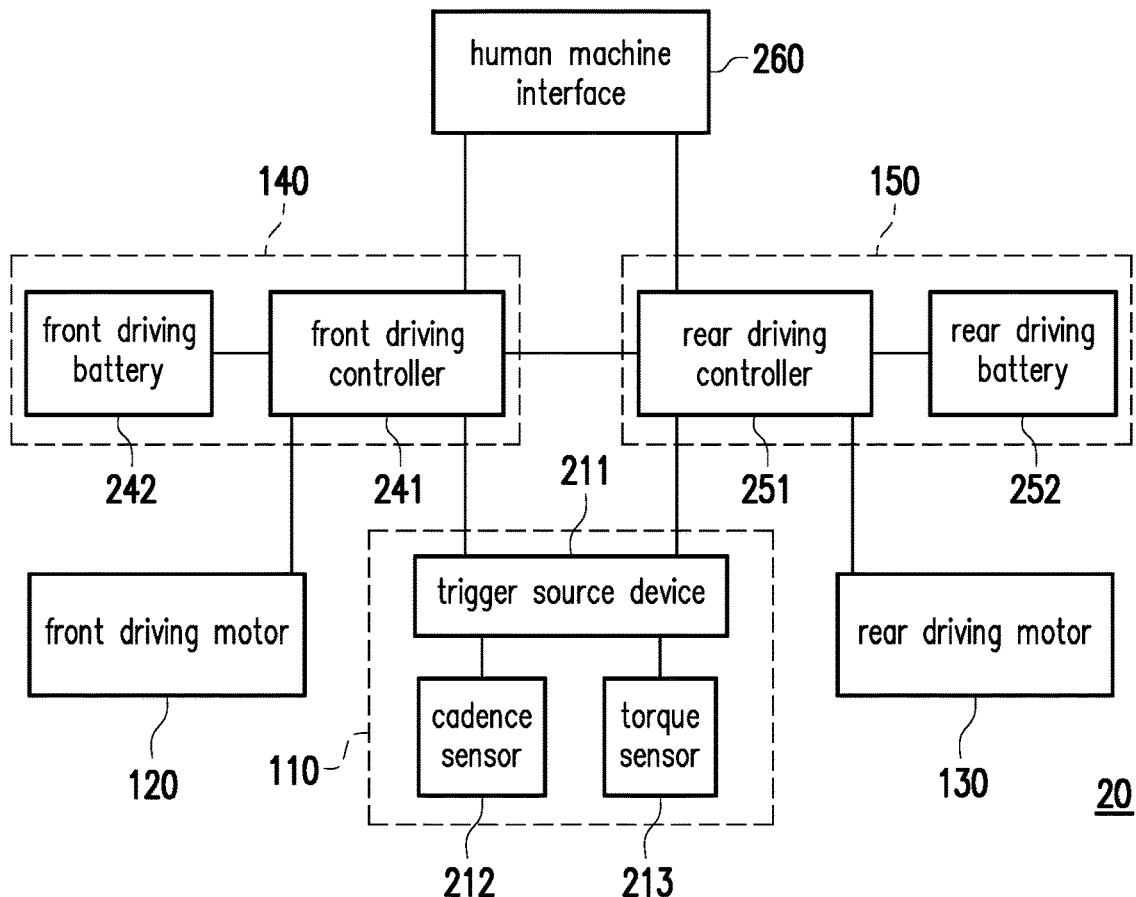
FIG. 2 is a block diagram of a motor driving system according to an embodiment of the present application.

FIG. 2 is a block diagram of a motor driving system according to an embodiment of the present application. Referring FIG. 2, the difference between FIG. 2 and FIG. 1 is that the motor driving system 20 in FIG. 2 further includes a human machine interface 210, the front driving device 140 includes a front driving controller 241 and a front driving battery 242, the rear driving device 150 includes a rear driving controller 251 and a rear driving battery 252, and the sensing device 110 includes a trigger source device 211, a cadence sensor 212 and a torque sensor 213. In this embodiment, all components in the motor driving system 20 are coupled via CAN, but not limited thereto.

In the embodiment, the human machine interface 210 is coupled to the front driving controller 241 of the front driving device 140 and the rear driving controller 251 of the rear driving device 150, and the human machine interface 210 is configured to provide setting information to the master controller. The setting information is, for example, a driving mode input by a user, such as a low-assist mode and a high-assist mode, but is not limited thereto.

The front driving controller 241 is coupled to the front driving motor 120, and the front driving controller 241 drives the front driving motor 120 according to the sensing information. The front driving battery 242 is coupled to the front driving controller 241 and configured to supply power to the front driving controller 241. The rear driving controller 251 is coupled to the rear driving motor 130, and the rear driving controller 251 drives the rear driving motor 130 according to the sensing information. The rear driving battery 252 is coupled to the rear driving controller 251 and configured to supply power to the rear driving controller 251. When the front driving device 140 is the master, that is, the front driving device 140 includes a master controller, it means that the front driving controller 241 is the master controller and the rear driving controller 251 is the slave controller. When the rear driving device 150 is the master, that is, the rear driving device 150 includes a master controller, it means that the rear driving controller 251 is the master controller and the front driving controller 241 is the slave controller.

Regarding the master-slave query operation, in the embodiment, the front driving device 140 can send a plurality of packets to the rear driving device 150 to query the rear driving device 150 whether there is a master controller. In addition, the rear driving device 150 can also send a plurality of packets to the front driving device 140 to inquire whether the front driving device 140 includes a master controller. Specifically, when the result of the master-slave query operation is that one of the front driving device 140 and the rear driving device 150 includes the master controller, the other is set to include the slave controller. For example, the front driving device 140 sends a plurality of packets to the rear driving device 150 to inquire whether the rear driving device 150 includes a master controller. The rear driving device 150 responds with "Yes", that is, the rear driving device 251 is the master controller. Then, the front driving device 140 can set the front driving device 140 to include the slave controller according to the response, that is, the front driving controller 241 is the slave controller. On the other hand, when the result of the master-slave query operation is that neither the front driving device 140 nor the rear driving device 150 includes a master controller, one of the front driving device 140 and the rear driving device 150 that perform the master-slave query operation first is set to include the master controller, and the other is set to include the slave controller. For example, the front driving device 140 sends a plurality of packets to the rear driving device 150 to inquire whether the rear driving device 150 includes a master controller, but receives no response from the rear driving device 150. After the front driving device 140 sends the packets, the rear driving device 150 also sends a plurality of packets to the front driving device 140 to inquire whether the front driving device 140 includes a master controller, but does not receive a response from the front driving device 140. Since neither the front driving device 140 nor the rear driving device 150 includes a master controller, and the front driving device 140 first sends packets to perform the master-slave query operation, the front driving device 140 will be set to include a master controller, that is, the front driving controller 241 is the master controller. Then, the rear driving device 150 is configured to include the slave controller, that is, the rear driving controller 251 is the slave controller.

Regarding power reading, one of the front driving controller 241 and the rear driving controller 251 set as the master controller can read the power of the front driving device 140 and the power of the rear driving device 150 (that is, read the power of the front driving battery 242 and the power of the rear driving battery 252), and calculate the sum of the two to generate total power. The master controller provides the total power to the human machine interface 260, and the human machine interface 260 displays the total power for user reference.

The cadence sensor 212 is coupled to the trigger source device 211 and is configured to generate rotational speed information by sensing the rotational speed of the electric bicycle. The torque sensor 213 is coupled to the trigger source device 211 and is configured to generate torque information by sensing the torque of the electric bicycle. The trigger source device 211 provides the rotational speed information and the torque information to the master controller.

Regarding motor driving, one of the front driving controller 241 and the rear driving controller 251 set as the master controller can generate driving commands according to the rotational speed information and torque information provided by the cadence sensor 212 and the torque sensor 213. Thereby, the front driving device 140 drives the front driving motor 120 according to the driving command, and the rear driving device 150 drives the rear driving motor 130 according to the driving command. In the embodiment, the master controller can determine whether the electric bicycle is in a hill-climbing, high-speed cruise or other modes according to the rotational speed information and the torque information, and generate corresponding driving commands accordingly. The driving commands can be shared with the slave controller to drive the front driving motor 120 and the rear driving motor 130 respectively. The judgment method of climbing and high-speed cruising can be determined based on, for example, whether the torque difference and the rotational speed of the front driving motor 120 and the rear driving motor 130 in the torque information and the rotational speed information are greater than a threshold value, or the difference in power consumption between the front driving motor 120 and the rear driving motor 130, but not limited thereto. The driving commands may include a start/stop command and a rotational speed command provided to the front driving motor 120, and a start/stop command and a rotational speed command provided to the rear driving motor 130.

In the embodiment, when the main controller determines that the electric bicycle is climbing according to the rotational speed information and the torque information, the front driving device 140 and the rear driving device 150 adjust the outputs of the front driving motor 120 and the rear driving motor 130 respectively, so that the output of the rear driving motor is greater than that of the front driving motor. Specifically, when climbing, the front driving controller 241 can increase the output of the rear driving motor 130 and reduce the output of the front driving motor 120 to avoid unnecessary power consumption. On the other hand, when the main controller determines that the electric bicycle is cruising at a high speed according to the rotational speed information and the torque information, the front driving device and the rear driving device adjust the outputs of the front driving motor and the rear driving motor respectively, so that the output of the front driving motor is greater than that of the rear driving motor. Specifically, during high-speed cruising, the front driving controller 241 can increase the output of the front driving motor 120 and reduce the output of the rear driving motor 130 to avoid unnecessary power consumption. In other embodiments, the main controller can also adjust the output of the front driving motor 120 and the rear driving motor 130 according to the residual power of the front driving battery 242 and the rear driving battery 252 to improve the battery life.

Figure 3:
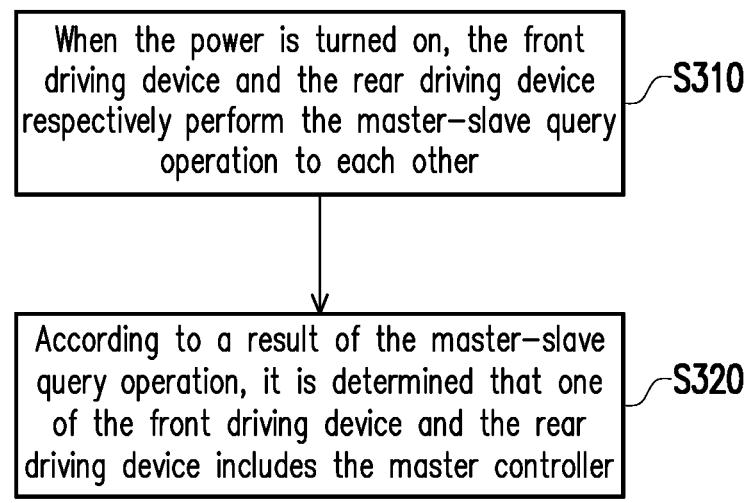
FIG. 3 is a flowchart of a motor driving method according to an embodiment of the present application.

FIG. 3 is a flowchart of a motor driving method according to an embodiment of the present application. Referring to FIG. 3, in Step S310, when the motor driving system 10 is powered on, the front driving device 140 and the rear driving device 150 respectively perform master-slave query operations to each other. Regarding the master-slave query operation, specifically, the front driving device 140 sends a plurality of packets to the rear driving device 150 to query whether the rear driving device 150 includes a master controller. In addition, the rear driving device 150 sends a plurality of packets to the front driving device 140 to inquire whether the front driving device 140 includes a main controller. Then, in Step S320, the motor driving system 10 determines that one of the front driving device 140 and the rear driving device 150 includes the master controller according to a result of the master-slave query operation.

To sum up, in the present invention, the front driving motor and the rear driving motor are driven by two driving devices, such as the front driving device and the rear driving device, respectively, so as to improve the stability of high-speed cruising. Under the dual-controller architecture, due to the low wattage required for each controller, the cost of the controller can be effectively reduced and the limitation of battery output current can be overcome. On the other hand, the output of the front driving motor and the rear driving motor can be dynamically adjusted to effectively save energy. Moreover, when one of the controllers fails, the other controller can still maintain normal operation to provide a backup mechanism.

Although the present application has been disclosed as above with embodiments, it is not intended to limit the present application, any person with ordinary knowledge in the technical field, without departing from the spirit and scope of the present application, can make some changes. Therefore, the protection scope of the present application shall be determined by the scope of the claims.

What is claimed is:

1. A motor driving system, adapted to an electronic bicycle, comprising:
 a sensing device, configured to generate sensing information;
 a front driving motor;
 a rear driving motor;
 a front driving device, coupled to the sensing device and the front driving motor, is configured to drive the front driving motor according to the sensing information; and
 a rear driving device, coupled to the sensing device, the rear driving motor and the front driving device, is configured to drive the rear driving motor according to the sensing information,
 wherein when the motor driving system is powered-up, the front driving device and the rear driving device respectively perform a master-slave query operation to each other, and it is determined that one of the front driving device and the rear driving device includes a master controller according to a result of the master-slave query operation,
 wherein when the result of the master-slave query operation is that one of the front driving device and the rear driving device includes the master controller, the other is set to include a slave controller,
 wherein when the result of the master-slave query operation is that neither the front driving device nor the rear driving device includes the master controller, one of the front driving device and the rear driving device that performs the master-slave query operation first is set to include the master controller, and the other is set to include the slave controller,
 wherein after the master-slave query operation, when a front driving controller in the front driving device is set as the master controller, the master controller generates a driving command according to a rotational speed information and a torque information, and a rear driving controller in the rear driving device drives the rear driving motor according to the driving command from the master controller of the front driving device, and
 wherein after the master-slave query operation, when the rear driving controller is set as the master controller, the master controller generates the driving command according to the rotational speed information and the torque information, and the front driving controller drives the front driving motor according to the driving command from the master controller of the rear driving device.

2. The motor driving system according to claim 1, wherein the master-slave query operation comprises:
 sending a plurality of packets asking whether to include the master controller.

3. The motor driving system according to claim 1, further comprises:
 a human machine interface, coupled to the front driving device and the rear driving device, is configured to provide setting information to the master controller.

4. The motor driving system according to claim 3, wherein the master controller reads the power of the front driving device and the power of the rear driving device, and provides the total power to the human machine interface for display, wherein the total power is the sum of the power of the front driving device and the power of the rear driving device.

5. The motor driving system according to claim 1, wherein the front driving device comprises:
the front driving controller, coupled to the front driving motor, is configured to drive the front driving motor according to the sensing information; and
a front driving battery, coupled to the front driving controller, is configured to supply power to the front driving controller.

6. The motor driving system according to claim 1, wherein the rear driving device comprises:
the rear driving controller, coupled to the rear driving motor, is configured to drive the rear driving motor according to the sensing information; and
a rear driving battery, coupled to the rear driving controller, is configured to supply power to the rear driving controller.

7. The motor driving system according to claim 1, wherein the sensing device comprises:
a trigger source device;
a cadence sensor, coupled to the trigger source device, is configured to generate the rotational speed information by sensing the rotational speed of the electric bicycle; and
a torque sensor, coupled to the trigger source device, is configured to generate the torque information by sensing the torque of the electric bicycle,
wherein the trigger source device provides the rotational speed information and the torque information to the master controller.

8. The motor driving system according to claim 7, wherein when the master controller determines that the electric bicycle is climbing according to the rotational speed information and the torque information, the front driving device and the rear driving device respectively adjust the output of the front driving motor and the rear driving motor, so that the output of the rear driving motor is greater than the output of the front driving motor.

9. The motor driving system according to claim 7, wherein when the main controller determines that the electric bicycle is cruising at a high speed according to the rotational speed information and the torque information, the front driving device and the rear driving device respectively adjust the output of the front driving motor and the rear driving motor, so that the output of the front driving motor is greater than the output of the rear driving motor.

10. The motor driving system according to claim 1, wherein all components in the motor driving system are coupled via a controller area network.

11. A motor driving method, adapted to a motor driving system of the electronic bicycle, wherein the motor driving system comprises a sensing device, a front driving motor, a rear driving motor, a front driving device, and a rear driving device, the motor driving method comprising:

performing the master-slave query operation respectively by the front driving device and the rear driving device to each other when the power is turned on; and
determining that one of the front driving device and the rear driving device includes a master controller according to a result of the master-slave query operation,
wherein when the result of the master-slave query operation is that one of the front driving device and the rear driving device includes the master controller, the other is set to include a slave controller, and
wherein when the result of the master-slave query operation is that neither the front driving device nor the rear driving device includes the master controller, one of the front driving device and the rear driving device that performs the master-slave query operation first is set to include the master controller, and the other is set to include the slave controller,
wherein after the master-slave query operation, when a front driving controller in the front driving device is set as the master controller, the master controller generates a driving command according to a rotational speed information and a torque information, and a rear driving controller in the rear driving device drives the rear driving motor according to the driving command from the master controller of the front driving device, and
wherein after the master-slave query operation, when the rear driving controller is set as the master controller, the master controller generates the driving command according to the rotational speed information and the torque information, and the front driving controller drives the front driving motor according to the driving command from the master controller of the rear driving device.

12. The motor driving method according to claim 11, wherein the master-slave query operation comprises:
sending a plurality of packets asking whether to include the master controller.

13. The motor driving method according to claim 11, wherein
when the result of the master-slave query operation is that both of the front driving device and the rear driving device include the master controller, one of the front driving device and the rear driving device that performs the master-slave query operation first is set to include the master controller, and the other is set to include the slave controller.

14. The motor driving method according to claim 11, further comprises:
sensing the rotational speed information and the torque information;
determining whether the electric bicycle is climbing or cruising at high speed according to the rotational speed information and the torque information,
when the electric bicycle is climbing, the output of the rear driving motor is greater than the output of the front driving motor,
when the electric bicycle is cruising at a high speed, the output of the front driving motor is greater than the output of the rear driving motor.

* * * * *